United States Patent
Sun et al.

(10) Patent No.: US 12,493,298 B2
(45) Date of Patent: Dec. 9, 2025

(54) CLEANING PATH PLANNING METHOD BASED ON PATHFINDING COST, CHIP, AND CLEANING ROBOT

(71) Applicant: AMICRO SEMICONDUCTOR CO., LTD., Guangdong (CN)

(72) Inventors: Ming Sun, Guangdong (CN); Zhuobiao Chen, Guangdong (CN); Zexin Chen, Guangdong (CN); Songzhou Xu, Guangdong (CN); Hewen Zhou, Guangdong (CN); Wu Yang, Guangdong (CN); Qinwei Lai, Guangdong (CN)

(73) Assignee: AMICRO SEMICONDUCTOR CO., LTD., Guangdong (CN)

( * ) Notice: Subject to any disclaimer, the term of this patent is extended or adjusted under 35 U.S.C. 154(b) by 179 days.

(21) Appl. No.: 18/032,561

(22) PCT Filed: Jun. 3, 2021

(86) PCT No.: PCT/CN2021/098193
§ 371 (c)(1),
(2) Date: Apr. 18, 2023

(87) PCT Pub. No.: WO2022/134483
PCT Pub. Date: Jun. 30, 2022

(65) Prior Publication Data
US 2023/0393584 A1   Dec. 7, 2023

(30) Foreign Application Priority Data
Dec. 25, 2020 (CN) .......................... 202011570703.X

(51) Int. Cl.
*G05D 1/00* (2024.01)

(52) U.S. Cl.
CPC .......... *G05D 1/0274* (2013.01); *G05D 1/0219* (2013.01); *G05D 1/0238* (2013.01)

(58) Field of Classification Search
CPC .. G05D 1/0274; G05D 1/0219; G05D 1/0238; G05D 1/0217; G05D 1/0246;
(Continued)

(56) References Cited

U.S. PATENT DOCUMENTS

| 10,488,865 | B2 | 11/2019 | Afrouzi et al. |
| 10,583,562 | B2 | 3/2020 | Stout et al. |

(Continued)

FOREIGN PATENT DOCUMENTS

| CN | 106774310 A | 5/2017 | |
| CN | 106805856 A * | 6/2017 | .......... A47L 11/4061 |

(Continued)

OTHER PUBLICATIONS

Machine translation of CN-107390698-A (Year: 2017).*

(Continued)

*Primary Examiner* — Scott A Browne
*Assistant Examiner* — Lidia Kwiatkowska
(74) *Attorney, Agent, or Firm* — The Sun IP Law

(57) ABSTRACT

Disclosed are a cleaning path planning method based on a pathfinding cost, a chip, and a cleaning robot. The method includes step 1, configuring cleaning lines in a map matching a cleaning area according to map boundaries and obstacle boundaries in different directions in the cleaning area of a mobile robot; step 2, setting a candidate entrance/exit satisfying a preset pathfinding cost condition and found in a current non-cleaned sub-block by the mobile robot at a current position as a cleaning entrance position of the current non-cleaned sub-block; step 3, controlling the mobile robot to move to the cleaning entrance position of the current non-cleaned sub-block; step 4, searching for and (Continued)

planning a cleaning entrance position and a cleaning termination position of a next non-cleaned sub-block by repeating steps 2-3 described above in a case of the mobile robot moves to the cleaning termination position of the current non-cleaned sub-block.

16 Claims, 2 Drawing Sheets

(58) Field of Classification Search
CPC ............... G05D 1/0212; A47L 11/4011; A47L 2201/06; A47L 11/24; A47L 11/40; A47L 2201/00
See application file for complete search history.

(56) References Cited

U.S. PATENT DOCUMENTS

| | | | |
|---|---|---|---|
| 2019/0061156 A1 | | 2/2019 | Li et al. |
| 2019/0094870 A1* | | 3/2019 | Afrouzi ................ G05D 1/0274 |

FOREIGN PATENT DOCUMENTS

| | | | | |
|---|---|---|---|---|
| CN | 107390698 A | * | 11/2017 | ........... G05D 1/0219 |
| CN | 108592923 A | | 9/2018 | |
| CN | 108776478 A | | 11/2018 | |
| CN | 109947114 A | | 6/2019 | |
| CN | 110251000 A | | 9/2019 | |
| CN | 110398964 A | | 11/2019 | |
| CN | 110494815 A | | 11/2019 | |
| CN | 111083361 A | | 4/2020 | |
| CN | 111436861 A | | 7/2020 | |
| CN | 111603099 A | | 9/2020 | |
| CN | 112068557 A | | 12/2020 | |
| CN | 112799398 A | | 5/2021 | |
| JP | 2009165823 A | | 7/2009 | |
| KR | 20140086245 A | | 7/2014 | |

OTHER PUBLICATIONS

Machine translation of CN-106805856A (Year: 2017).*
China National Intellectual Property Administration, International Search Report for International Application No. PCT/CN2021/098193 mailed Sep. 29, 2021.
China National Intellectual Property Administration, Search Report for CN Application No. CN202011570703.X filed on Dec. 25, 2020.
The extended European search report of the corresponding EP patent application No. 21908491.0 mail date Jan. 9, 2024.

* cited by examiner

CLEANING PATH PLANNING METHOD BASED ON PATHFINDING COST, CHIP, AND CLEANING ROBOT

CROSS-REFERENCE TO RELATED APPLICATION

The present disclosure is based upon and claims priority to Chinese Patent Application No. 202011570703.X, filed to the China National Intellectual Property Administration on Dec. 25, 2020 and entitled "Cleaning Path Planning Method Based on Pathfinding cost, Chip, and Cleaning Robot", the disclosure of which is hereby incorporated by reference in its entirety.

TECHNICAL FIELD

The disclosure relates to the technical field of path cost of a robot under the technology of simultaneous localization and mapping (SLAM), and in particular to a cleaning path planning method based on a pathfinding cost, a chip, and a cleaning robot.

BACKGROUND

Currently, cleaning robots such as floor sweepers, window cleaners, and floor scrubbers are required to cover all the reachable indoor cleaning working areas with the shortest path. Whether cleaning path planning is rational and efficient has a direct impact on the cleaning effect and the user's intuitive perception of the product quality.

In a device known to the inventors, in a case of the cleaning robot cleans each area to be cleaned, some areas are repeatedly cleaned as the cleaning robot shuttles there, while some other areas are not cleaned as the cleaning robot has not travelled there yet. In the case of a larger number of planned area blocks to be traversed by the robot and a higher distribution density of position areas, the problem that local areas are not cleaned sequentially along the navigation path or the problem that the same local area is repeatedly cleaned along the navigation path will be caused due to global coverage cleaning in the cleaning area. Accordingly, it may be difficult to tell already cleaned ones and non-cleaned ones of areas to be cleaned apart, thereby affecting the cleaning effect of the entire cleaning area. As a result, a longer time is required for the robot to plan a path between working areas, thereby reducing the intelligence of the cleaning robot and the use experience of a user.

SUMMARY

The disclosure provides a cleaning path planning method based on a pathfinding cost, a chip, and a cleaning robot.

The cleaning path planning method based on a pathfinding cost includes: step 1, cleaning lines are configured in a map matching a cleaning area according to map boundaries and obstacle boundaries in different directions in the cleaning area of a mobile robot, correspondingly the map is divided into a preset number of sub-blocks in combination with the cleaning lines serving as sub-block division lines and the obstacle boundaries, and in each sub-block, an endpoint position of a cleaning line serving as the sub-block division line is marked as a candidate entrance/exit of the sub-block, and the cleaning lines serving as the sub-block division lines are further configured for forming a bow-shaped cleaning path planned in the sub-block;

step 2, a candidate entrance/exit satisfying a preset pathfinding cost condition and found in a current non-cleaned sub-block by the mobile robot at a current position is set as a cleaning entrance position of the current non-cleaned sub-block, and a cleaning termination position of the current non-cleaned sub-block is determined combining the cleaning entrance position and a bow-shaped cleaning path planned in the current non-cleaned sub-block;

step 3, the mobile robot is controlled to move to the cleaning entrance position of the current non-cleaned sub-block, and then to start to perform cleaning and traversing along the bow-shaped cleaning path in the current non-cleaned sub-block; and step 4, a cleaning entrance position and a cleaning termination position of a next non-cleaned sub-block are searched for and planned by repeating steps 2-3 described above in a case of the mobile robot moves to the cleaning termination position of the current non-cleaned sub-block, and the bow-shaped cleaning path planned in the current non-cleaned sub-block with a bow-shaped cleaning path planned in the next non-cleaned sub-block are combined into a finally-planned cleaning path of the mobile robot in the cleaning area in a successive order of traversing the cleaning termination position of the current non-cleaned sub-block and the cleaning entrance position of the next non-cleaned sub-block until all the sub-blocks are cleaned.

In some embodiments, in a case of the method returns to the step 2 from the step 4, the cleaning termination position of the current non-cleaned sub-block is updated as the current position, and a candidate entrance/exit satisfying the preset pathfinding cost condition and found at the cleaning termination position is taken as the cleaning entrance position of the next non-cleaned sub-block.

In some embodiments, in a case of sub-blocks positioned in the same row of the cleaning area are cleaned along planned bow-shaped cleaning paths, the mobile robot repeats steps 2-3 to search for and plan cleaning entrance positions and cleaning termination positions of non-cleaned sub-blocks in a next row, and then enters and cleans the non-cleaned sub-blocks in the next row.

In some embodiments, the step 2 further includes: in all non-cleaned sub-blocks, a length of a vertical line segment between a cleaning line distributed on an outermost side in a positive direction of a first preset coordinate axis and a current search position of the mobile robot is set as a positive-direction pathfinding distance, formed in the positive direction of the first preset coordinate axis of the mobile robot, and a length of a vertical line segment between a cleaning line distributed on an outermost side in a negative direction of the first preset coordinate axis and the current search position of the mobile robot is set as a negative-direction pathfinding distance, formed in the negative direction of the first preset coordinate axis of the mobile robot; and a pathfinding cost for the mobile robot to search for the candidate entrance/exit in a direction of a corresponding coordinate axis is calculated according to a ratio of the negative-direction pathfinding distance to the positive-direction pathfinding distance, so that in a case of a pathfinding cost, in one direction of the first preset coordinate axis, of the mobile robot is a minimum area pathfinding cost, a relatively smaller pathfinding cost is selected from a maximum area pathfinding cost and an adjusted minimum area pathfinding cost as a pathfinding cost in the other direction of the first preset coordinate axis, and the relatively smaller pathfinding cost does not exceed the maximum area pathfinding cost;

and the maximum area pathfinding cost and the minimum area pathfinding cost are set according to cleaning planning requirements of the current cleaning area.

In some embodiments, in the step 1, the bow-shaped cleaning path in the current non-cleaned sub-block consists of the cleaning lines of the sub-block to which the current non-cleaned sub-block belongs, where a head end and a tail end of a bow-shaped cleaning path in each sub-block are set as candidate entrances/exits of the corresponding sub-block.

In some embodiments, in the step 1, a method for in each sub-block, the endpoint position of a cleaning line serving as the sub-block division line is set as a candidate entrance/exit of the sub-block includes:

a tail end of the bow-shaped cleaning path is set as the cleaning termination position of the current non-cleaned sub-block in a case of a head end of the bow-shaped cleaning path planned in the current non-cleaned sub-block is determined as the cleaning entrance position; and alternatively, a head end of the bow-shaped cleaning path is set as the cleaning termination position of the current non-cleaned sub-block in a case of a tail end of the bow-shaped cleaning path planned in the current non-cleaned sub-block is determined as the cleaning entrance position.

In some embodiments, a method for a pathfinding cost is calculated for searching for the candidate entrance/exit in the direction of the first preset coordinate axis according to the ratio of the negative-direction pathfinding distance to the positive-direction pathfinding distance includes:

a pathfinding cost for the mobile robot is set to search for the candidate entrance/exit in the positive direction of the first preset coordinate axis from the current position to the current search position as the minimum area pathfinding cost in a case of the ratio of the negative-direction pathfinding distance to the positive-direction pathfinding distance is greater than 1, a product of the minimum area pathfinding cost and the ratio greater than 1 is taked as the adjusted minimum area pathfinding cost, and then the relatively smaller pathfinding cost is selected from the maximum area pathfinding cost and the adjusted minimum area pathfinding cost as a pathfinding cost for searching for the candidate entrance/exit in the negative direction of the first preset coordinate axis from the current position to the current search position;

a pathfinding cost for the mobile robot to search for the candidate entrance/exit in the positive direction of the first preset coordinate axis from the current position to the current search position is set as the minimum area pathfinding cost, and a pathfinding cost for the mobile robot to search for the candidate entrance/exit in the negative direction of the first preset coordinate axis from the current position to the current search position is set as the minimum area pathfinding cost in a case of the ratio of the negative-direction pathfinding distance to the positive-direction pathfinding distance is equal to 1;

and a pathfinding cost for the mobile robot to search for the candidate entrance/exit in the negative direction of the first preset coordinate axis from the current position to the current search position is set as the minimum area pathfinding cost in a case of the ratio of the negative-direction pathfinding distance to the positive-direction pathfinding distance is less than 1, a ratio of the minimum area pathfinding cost to the ratio less than 1 is taked as the adjusted minimum area pathfinding cost, and then the relatively smaller pathfinding cost is selected from the maximum area pathfinding cost and the adjusted minimum area pathfinding cost as a pathfinding cost for searching for the candidate entrance/exit in the positive direction of the first preset coordinate axis from the current position to the current search position.

In some embodiments, the step 2 specifically includes:

that a first found candidate entrance/exit satisfies the preset pathfinding cost condition is determined, and the first found candidate entrance/exit is set as the cleaning entrance position of the current non-cleaned sub-block in a case of the mobile robot at the current position finds and traverses the candidate entrance/exit at the current search position, and it is calculated that the pathfinding cost on the second preset coordinate axis equals a preset multiple of the preset reference cost, the pathfinding cost for searching for the candidate entrance/exit in the positive direction of the first preset coordinate axis equals a preset multiple of the minimum area pathfinding cost, and the pathfinding cost for searching for the candidate entrance/exit in the negative direction of the first preset coordinate axis equals a preset multiple of the maximum area pathfinding cost; and the preset multiple is an integer greater than or equal to 1; the found candidate entrance/exit is the current search position; and in a search process, a machine body position of the mobile robot is unchanged, but the current search position is changed.

In some embodiments, a method for the candidate entrance/exit satisfying the preset pathfinding cost condition and found in the current non-cleaned sub-block by the mobile robot at the current position is set as the cleaning entrance position of the current non-cleaned sub-block includes:

the mobile robot is enabled to start to search from a map grid position corresponding to the current position and to search for and traverse a map grid distance corresponding to the preset reference cost in the positive direction of the first preset coordinate axis on the map in a case of every a map grid distance corresponding to the minimum area pathfinding cost is searched for and traversed in the positive direction and the negative direction of the second preset coordinate axis;

the mobile robot is enabled to search for and traverse the map grid distance corresponding to the preset reference cost in the negative direction of the first preset coordinate axis from the map grid position corresponding to the current position of the mobile robot in a case of every a map grid distance corresponding to the maximum area pathfinding cost is searched for and traversed in the positive direction and the negative direction of the second preset coordinate axis;

and the two steps described above are repeated, and that the first found and traversed candidate entrance/exit satisfies the preset pathfinding cost condition is determined, and the candidate entrance/exit is set as the cleaning entrance position of the current non-cleaned sub-block in a case of it is calculated that a pathfinding cost for searching and traversing in the positive direction or the negative direction of the second preset coordinate axis equals a preset multiple of the preset reference cost, the pathfinding cost for searching and traversing in the positive direction of the first preset coordinate axis equals the preset multiple of the minimum area pathfinding cost, and the pathfinding cost for searching and traversing in the negative direction of the first preset coordinate axis equals the preset multiple of the maximum area pathfinding cost at the current search position;

and in a case of every one map grid is searched for and traversed, whether the map grid currently found is the marked candidate entrance/exit is determined in real time.

In some embodiments, in a case of the first preset coordinate axis is an X axis of the map, the second preset coordinate axis is a Y axis of the map; and in a case of the second preset coordinate axis is an X axis of the map, the first preset coordinate axis is a Y axis of the map.

In some embodiments, disclosed is the chip, internally configured with a control program, where the control program is configured for controlling a mobile robot to execute the cleaning path planning method based on a pathfinding cost.

In some embodiments, disclosed is the cleaning robot, configured with a master control chip, where the master control chip is the chip.

DETAILED DESCRIPTION OF THE EMBODIMENTS

The technical solutions in the examples of the disclosure are described in detail below with reference to the accompanying drawings in the examples of the disclosure. The following examples and features in the examples can be combined with one another without conflict. In the following description, specific details are given to provide a thorough understanding of the examples. However, those of ordinary skill in the art will understand that the examples can be implemented without these specific details. For example, circuits can be shown in a block diagram, so as not to obscure the examples in unnecessary details. In other cases, well-known circuits, structures, and techniques may not be shown in detail, so as not to obscure the examples.

An execution body of calculation planning in the examples of the disclosure is a mobile robot, which can be an intelligent mobile robot such as a floor sweeping robot, a lawn mowing robot, a window cleaning robot, and a demining robot. The robot can encompass a machine body, a sensing system, a control system, a driving system, a cleaning system, an energy system, a human-computer interaction system, etc.

Figure 1:
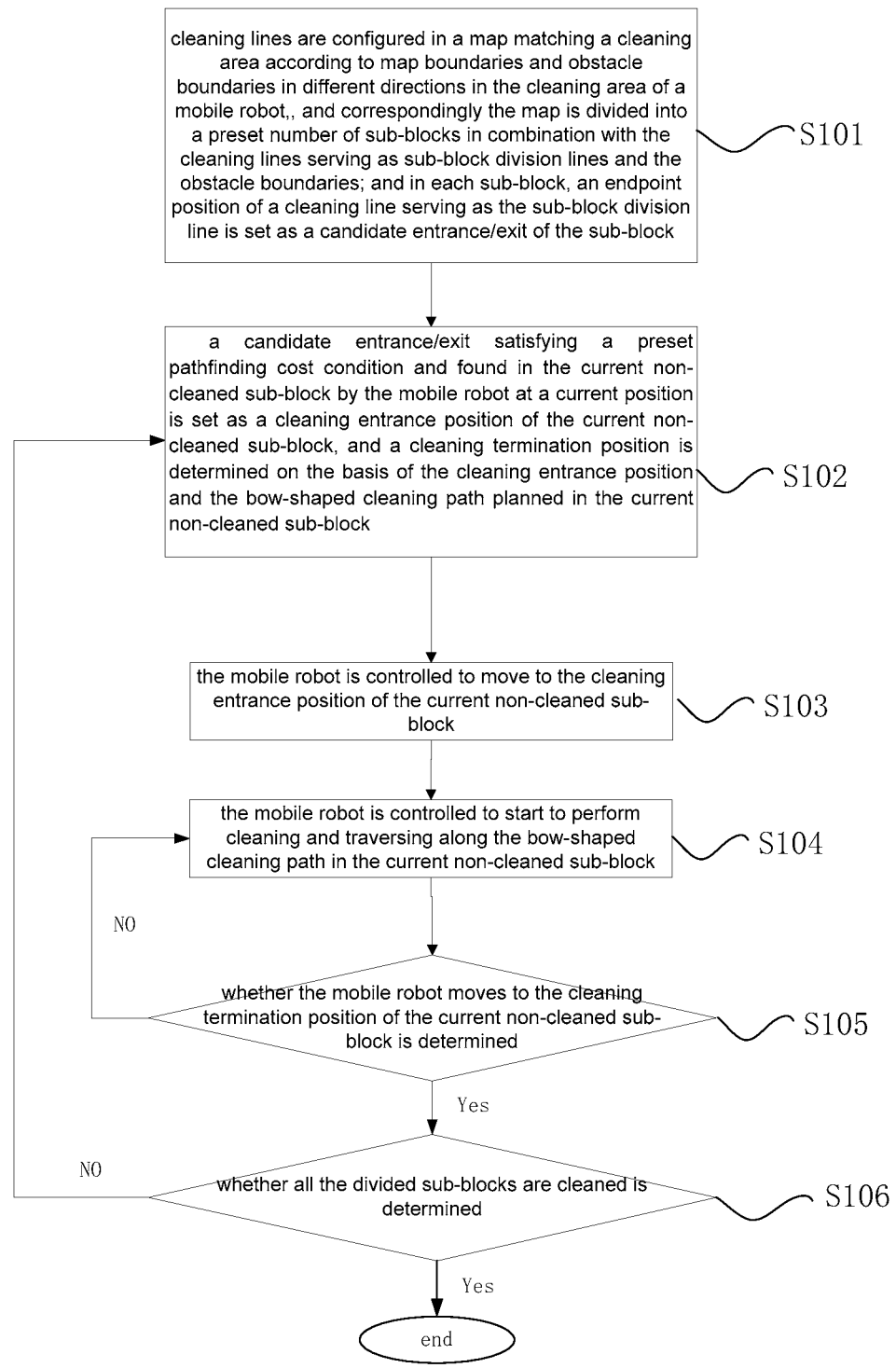
FIG. 1 is a flowchart of a cleaning path planning method based on a pathfinding cost according to an example of the disclosure.

A cleaning path planning method based on a pathfinding cost according to an example of the disclosure is as shown in FIG. 1. The cleaning path planning method includes:

Step S101, cleaning lines are configured in a map matching a cleaning area according to map boundaries and obstacle boundaries in different directions in the cleaning area of a mobile robot, and correspondingly the map is divided into a preset number of sub-blocks in combination with the cleaning lines serving as sub-block division lines and the obstacle boundaries; and in each sub-block, an endpoint position of a cleaning line serving as the sub-block division line is set as a candidate entrance/exit of the sub-block;

and step S102 is entered. The cleaning lines serving as the sub-block division lines are also configured for forming a bow-shaped cleaning path in the sub-block, so that one sub-block is covered with the cleaning lines capable of being continuously connected in a right-square-bracket shape. It is to be noted that the preset number is related to distribution positions and the number of obstacles in the cleaning area. The sub-blocks are non-cleaned sub-blocks before being traversed by the mobile robot. Owing to obstruction of the obstacles, within the area indicated by the positive or negative direction of the first preset coordinate axis, two or more sub blocks spaced apart along the positive and negative directions of the second preset coordinate axis are occupied shown as sub-blocks #1, #2, and #3 in a first row in FIG. 2.

Figure 2:
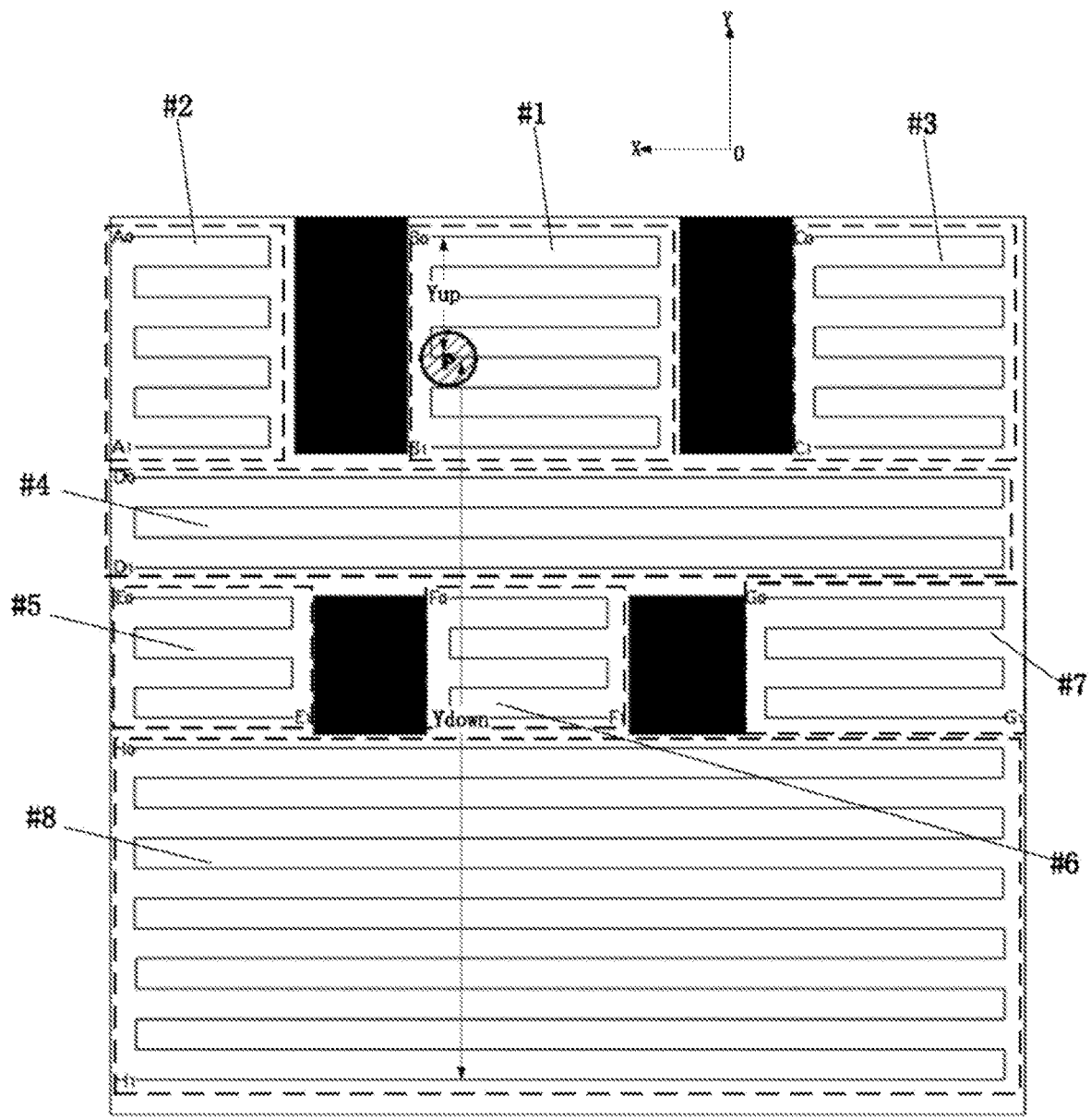
FIG. 2 is a schematic diagram of a mobile robot performing path planning in a cleaning area according to an example of the disclosure.

Moreover, without obstruction of the obstacles, the area occupies a space in the positive direction or the negative direction of the first preset coordinate axis independently to become one sub-block shown as sub-block #4 in a second row in FIG. 2.

The bow-shaped cleaning path in the current non-cleaned sub-block consists of cleaning lines of the sub-block to which the current non-cleaned sub-block belongs, and these cleaning lines are planned as relatively longer linear path segments in the bow-shaped cleaning path of the mobile robot, so that a head end and a tail end of the bow-shaped cleaning path in each sub-block are set as candidate entrances/exits of the corresponding sub-block. In the step, the cleaning area may be divided into several regular geometric figures which are easy to clean by setting the sub-blocks and the cleaning lines.

It is to be added that a method for the step that in each sub-block, the endpoint position of the cleaning line serving as the sub-block division line is set as the candidate entrance/exit of the sub-block includes: a tail end of the bow-shaped cleaning path is set as a cleaning termination position of the current non-cleaned sub-block in a case of a head end of the bow-shaped cleaning path planned in the current non-cleaned sub-block is determined as the cleaning entrance position; and alternatively, a head end of the bow-shaped cleaning path is set as the cleaning termination position of the current non-cleaned sub-block in a case of a tail end of the bow-shaped cleaning path planned in the current non-cleaned sub-block is determined as the cleaning entrance position.

As shown in FIG. 2, the cleaning area is a rectangular area in a room. The mobile robot detects a boundary (a north edge) in a positive direction of a Y axis, a boundary (a south edge) in a negative direction of the Y axis, a boundary (a west edge) in a positive direction of an X axis, and a boundary (an east edge) in a negative direction of the X axis of the cleaning area, respectively. In the cleaning area, the mobile robot sets the cleaning lines on the map according to the map boundaries. These cleaning lines are sequentially arranged from the positive direction of the Y axis to the negative direction of the Y axis at set intervals, and a cleaning line closest to a map boundary in the positive direction of the Y axis is an edge cleaning line, and a cleaning line closest to a map boundary in the negative direction of the Y axis is also an edge cleaning line.s Before executing step S101, the mobile robot constructs a global map according to the obstacles in the cleaning area, so that the mobile robot may obtain the map boundaries and the obstacle boundaries from the global map. During specific application, the mobile robot starts from any point of the cleaning area. In a movement process, an environment map construction module inside the mobile robot repeatedly senses environment feature information (corners, pillars, furniture, etc.), and marks position of the obstacles according to the sensed environment feature information, so as to construct a map encompassing obstacle information (a pure black area in FIG. 2 is an impenetrable obstacle). Then it may be seen from FIG. 2 that the mobile robot sets several cleaning lines, which may be connected into the bow-shaped cleaning path, on the map according to the map boundaries and the obstacle boundaries. Starting from a boundary (a boundary in the positive direction of the X coordinate axis) of the map, the cleaning line stops in a case of a boundary (a boundary in the negative direction of the X coordinate axis) on another side of the map or a boundary on one side of the obstacle is detected. In a case of the boundary on one side of the obstacle is met, the cleaning line immediately starts from a boundary on another side of the obstacle until a boundary on another side of the map is detected.

Distances between the cleaning lines are equal. Next, the mobile robot takes a cleaning line whose two ends are positioned at boundaries on two sides of the map, respectively, and spaced from the obstacle by at least one radius of the mobile robot as the sub-block division line. If the division line is positioned between two obstacles (including walls) and a distance between the two obstacles is less than a diameter of the mobile robot, the two obstacles are regarded as a whole, and the cleaning line is not taken as the division line. Finally, the mobile robot divides the map in FIG. 2 into sub-blocks #1, #2, #3, #4, #5, #6, #7, and #8 by taking the sub-block division lines and the boundaries on two sides of the obstacles as boundaries.

In each sub-block shown in FIG. 2, an endpoint position of a cleaning line serving as the sub-block division line, parallel to the direction of the X axis, of the sub-block, is set as a candidate entrance/exit of the sub-block. For example, candidate entrances/exits of sub-block #1 include an end point A0 of an uppermost cleaning line (a division line of sub-block #1) and an end point A1 of a lowermost cleaning line (another division line of sub-block #1) in sub-block #1, candidate entrances/exits of sub-block #2 include an end point B0 of an uppermost cleaning line (a division line of sub-block #2) and an end point B1 of a lowermost cleaning line (another division line of sub-block #2) in sub-block #2, candidate entrances/exits of sub-block #3 include an end point C0 of an uppermost cleaning line (a division line of sub-block #3) and an end point C1 of a lowermost cleaning line (another division line of sub-block #3) in sub-block #3, candidate entrances/exits of sub-block #4 include an end point D0 of an uppermost cleaning line (a division line of sub-block #4) and an end point D1 of a lowermost cleaning line (another division line of sub-block #4) in sub-block #4, candidate entrances/exits of sub-block #5 include an end point E0 of an uppermost cleaning line (a division line of sub-block #5) and an end point E1 of a lowermost cleaning line (another division line of sub-block #5) in sub-block #5, candidate entrances/exits of sub-block #6 include an end point F0 of an uppermost cleaning line (a division line of sub-block #6) and an end point F1 of a lowermost cleaning line (another division line of sub-block #6) in sub-block #6, candidate entrances/exits of sub-block #7 include an end point G0 of an uppermost cleaning line (a division line of sub-block #7) and an end point G1 of a lowermost cleaning line (another division line of sub-block #7) in sub-block #7, candidate entrances/exits of sub-block #8 include an end point H0 of an uppermost cleaning line of sub-block #8 (a division line of sub-block #8) and an end point H1 of a lowermost cleaning line (another division line of sub-block #8) in sub-block #8.

Step S102, a candidate entrance/exit satisfying a preset pathfinding cost condition and found in the current non-cleaned sub-block by the mobile robot at a current position is set as a cleaning entrance position of the current non-cleaned sub-block, and a cleaning termination position is determined on the basis of the cleaning entrance position and the bow-shaped cleaning path planned in the current non-cleaned sub-block.

Then step S103 is entered. A head end of the bow-shaped cleaning path is set as the cleaning entrance position of the current non-cleaned sub-block in a case of determined as the candidate entrance/exit satisfying the preset pathfinding cost condition, and a tail end of the bow-shaped cleaning path is set as the cleaning termination position of the current non-cleaned sub-block; and alternatively, a tail end of the bow-shaped cleaning path is set as the cleaning entrance position of the current non-cleaned sub-block in a case of determined as the candidate entrance/exit satisfying the preset pathfinding cost condition, and a head end of the bow-shaped cleaning path is set as the cleaning termination position of the current non-cleaned sub-block. In a case of every a map grid is searched for and traversed, and the map grid currently searched for is the marked candidate entrance/exit is determined in real time.

As an example, before the candidate entrance/exit satisfying the preset pathfinding cost condition is found, the following pathfinding cost calculation step is required to be performed. The method specifically includes:

In all non-cleaned sub-blocks, a cleaning line, with a maximum length relative to a vertical line segment at the current search position, selected in the positive direction of the first preset coordinate axis is a cleaning line distributed on an outermost side (an outermost side of an uppermost non-cleaned sub-block) in the positive direction of the first preset coordinate axis.

The length of the cleaning line distributed on the outermost side in the positive direction of the first preset coordinate axis and a vertical line segment at the current search position of the mobile robot is set as a positive-direction pathfinding distance, formed in the positive direction of the first preset coordinate axis, of the mobile robot. As shown in FIG. 2, an initial position P (which is also the current search position, but in a search process, a machine body position of the mobile robot is unchanged, and the current search position is changed) of the mobile robot is positioned in sub-block #1, the cleaning line distributed on the outermost side in the positive direction of the first preset coordinate axis selected in this case is an uppermost cleaning line in sub-block #1 that is not planned to be cleaned, and the positive-direction pathfinding distance, formed on the basis of the current search position, in the positive direction of the first preset coordinate axis is Yup shown in FIG. 2.

In all the non-cleaned sub-blocks, a cleaning line, with a maximum length relative to a vertical line segment at the current search position, selected in the negative direction of the first preset coordinate axis is a cleaning line distributed on an outermost side (an outermost side of a lowermost non-cleaned sub-block) in the negative direction of the first preset coordinate axis. The length of a vertical line segment between a cleaning line distributed on an outermost side in a negative direction of the first preset coordinate axis and the current search position of the mobile robot is set as a negative-direction pathfinding distance, formed in the negative direction of the first preset coordinate axis, of the mobile robot. As shown in FIG. 2, the current search position P is positioned in sub-block #1, the cleaning line distributed on the outermost side in the negative direction of the first preset coordinate axis selected in this case is an lowermost cleaning line in sub-block #8 that is not planned to be cleaned, and the negative-direction pathfinding distance, formed on the basis of the current search position of the mobile robot, in the negative direction of the first preset coordinate axis is Ydown shown in FIG. 2.

Then a pathfinding cost for the mobile robot to search for the candidate entrance/exit in a direction of a corresponding coordinate axis is calculated according to a ratio of the negative-direction pathfinding distance to the positive-direction pathfinding distance. In fact, a minimum area pathfinding cost is adjusted and calculated, so that in a case of a pathfinding coat, in one direction (the positive direction) of the first preset coordinate axis, of the mobile robot is the minimum area pathfinding cost, a relatively smaller pathfinding cost is selected from a maximum area pathfinding cost and an adjusted minimum area pathfinding cost as a pathfinding cost in the other direction (the negative direction) of the first preset coordinate axis, and the relatively smaller pathfinding cost does not exceed the maximum area pathfinding cost. In this case, the calculated pathfinding cost, in one direction (the positive direction) of the first preset coordinate axes, of the mobile robot and the calculated pathfinding cost, in the other direction (the negative direction) of the first preset coordinate axis, of the mobile robot serve as determination bases, or the pathfinding costs in the positive direction and the negative direction of the first preset coordinate axis are updated and adjusted according to the change of the ratio of the negative-direction pathfinding distance to the positive-direction pathfinding distance, so that the mobile robot searches for the candidate entrance/exit satisfying the preset pathfinding cost condition from the map at the current search position in a later stage. The maximum area pathfinding cost and the minimum area pathfinding cost are set according to cleaning planning requirements of a current cleaning area or obstacle distribution features of the current cleaning area. In the example, according to a distance relation between the cleaning lines in two opposite directions of the same coordinate axis and the current search position of the robot, a sub-block entrance search path, with a lower traversal difficulty, found by the robot is selected. Compared with a device known to the inventors, the number of turn-back and reciprocated travelling, in a bow-shaped cleaning process in the same sub-block, of the robot is reduced.

A method for the step that a pathfinding cost for the mobile robot to search for the candidate entrance/exit in a direction of a corresponding coordinate axis is calculated according to a ratio of the negative-direction pathfinding distance to the positive-direction pathfinding distance includes:

In a case of the ratio of the negative-direction pathfinding distance to the positive-direction pathfinding distance is greater than 1, the first preset coordinate axis is taken as a Y axis and the second preset coordinate axis is taken as an X axis as an example, a pathfinding cost Ycup for the mobile robot to search for the candidate entrance/exit in the positive direction of the first preset coordinate axis Y from the current position P to the current search position (the continuously-updated search position) is a minimum area pathfinding cost Ycmin, and a product of the ratio Cy of the negative-direction pathfinding distance Ydown to the positive-direction pathfinding distance Yup and the minimum area pathfinding cost Ycmin is taken as an adjusted minimum area pathfinding cost Ycmin*Cy. Then the relatively smaller pathfinding cost is selected from a maximum area pathfinding cost Ycmax and the adjusted minimum area pathfinding cost Ycmin*Cy as the pathfinding cost for searching the candidate entrance/exit in the negative direction of the first preset coordinate axis from the current position to the current search position.

In a case of the ratio of the negative-direction pathfinding distance to the positive-direction pathfinding distance is equal to 1, the first preset coordinate axis is taken as a Y axis, and the second preset coordinate axis is taken as an X axis as an example, a pathfinding cost Ycup for the mobile robot to search for the candidate entrance/exit in the positive direction of the first preset coordinate axis Y from the current position P to the current search position is set as a minimum area pathfinding cost Ycmin. Moreover, a pathfinding cost Ycdown for the mobile robot to search for the candidate entrance/exit in the negative direction of the first preset coordinate axis Y from the current position to the current search position is set as a minimum area pathfinding cost Ycmin, so that in a case of the mobile robot at the current position calculates and detects that the ratio of the negative-direction pathfinding distance to the positive-direction pathfinding distance is equal to 1, the calculated pathfinding cost for searching for the candidate entrance/exit in the positive direction of the first preset coordinate axis is equal to the calculated pathfinding cost for searching for the candidate entrance/exit in the negative direction of the first preset coordinate axis. The pathfinding cost for searching for the candidate entrance/exit in the positive direction of the first preset coordinate axis Y to the current search position is represented by Ycup, which is not shown in the figure. The pathfinding cost for searching for the candidate entrance/exit in the negative direction of the first preset coordinate axis Y to the current search position is represented by Ycdown, which is not shown in the figure. Furthermore, in a case of the first preset coordinate axis is the X axis, the pathfinding cost described above is named with another label having the same attribute.

In a case of the ratio of the negative-direction pathfinding distance to the positive-direction pathfinding distance is less than 1, the first preset coordinate axis is taken as a Y axis, and the second preset coordinate axis is taken as an X axis as an example, a pathfinding cost for the mobile robot to search for the candidate entrance/exit in the negative direction of the first preset coordinate axis Y from the current position P to the current search position is set as a minimum area pathfinding cost Ycmin. In this case, a ratio Cy of the negative-direction pathfinding distance Ydown to the positive-direction pathfinding distance Yup is less than 1. Moreover, a ratio Ycmin/Cy of the minimum area pathfinding cost Ycmin to Cy is taken as the adjusted minimum area pathfinding cost. Then the relatively smaller pathfinding cost is selected from a maximum area pathfinding cost Ycmax and the adjusted minimum area pathfinding cost Ycmin/Cy as the pathfinding cost for searching for the candidate entrance/exit in the positive direction of the first preset coordinate axis from the current position to the current search position. Through different Ycmin and Ycmax, and different Cy ratio calculation formulas, flexible planning strategy changes may be obtained to adapt to cleaning path planning requirements under different products and scenarios.

It should be noted that the minimum area pathfinding cost is named with Ycmin, which is not shown in the figure. The maximum area pathfinding cost is named with Ycmax, which is not shown in the figure. The ratio of the negative-direction pathfinding distance to the positive-direction pathfinding distance is represented by Cy, which is not shown in the figure. Similarity, in a method for calculating a pathfinding cost with the first preset coordinate axis as the X axis and the second preset coordinate axis as the Y axis as an example, coordinates of the X axis and coordinates of the Y axis are exchanged with each other, and coordinate directions are also exchanged with each other. Certainly, the layout of the cleaning line in the cleaning area will also be adjusted correspondingly, which is a result that may be deduced by a person skilled in the art on the basis of the contents of the foregoing example, and thus will not be repeated herein.

In the example, a large pathfinding cost for searching for the candidate entrance/exit is adjusted according to the ratio of the negative-direction pathfinding distance to the positive-direction pathfinding distance calculated by the mobile robot at the same position, so that a relatively greater one of the pathfinding cost in the positive direction of the first preset coordinate axis and the pathfinding cost in the negative direction of the first preset coordinate axis does not exceed the maximum area pathfinding cost, which is conducive to cleaning of a room at a low cost. Therefore, the mobile robot tends to select the sub-block with a low path cost for cleaning, instead of selecting the closest candidate entrance/exit as the cleaning entrance position of the corresponding sub-block.

According to the example described above, a first found candidate entrance/exit is determined to satisfy the preset pathfinding cost condition, and set as the cleaning entrance position of the current non-cleaned sub-block in a case of the mobile robot at the current position finds and traverses the candidate entrance/exit in the current non-cleaned sub-block, and it is calculated that the pathfinding costs in the positive position or the negative direction of the second preset coordinate axis equals a preset multiple of a preset reference cost, the pathfinding cost for searching for the candidate entrance/exit in the positive direction of the first preset coordinate axis equals a preset multiple of the minimum area pathfinding cost, and the pathfinding cost for searching for the candidate entrance/exit in the negative direction of the first preset coordinate axis equals a preset multiple of the maximum area pathfinding cost. Therefore, the first candidate entrance/exit is a cleaning start position of the bow-shaped cleaning path in the current non-cleaned sub-block, and then an endpoint position of the bow-shaped cleaning path in the current non-cleaned sub-block is determined as the cleaning termination position of the current non-cleaned sub-block. The pathfinding costs in different directions are configured for planning the cleaning entrance positions of the corresponding sub-blocks, thereby simplifying sub-block division and an order planning flow, reducing the calculation complexity, and shortening a navigation distance between different sub-blocks. On the basis of the constraint in the example described above, a calculation error in pathfinding cost is also reduced, and a planning effect of the cleaning path is ensured. The preset multiple is an integer greater than or equal to 1. The found candidate entrance/exit is also the current search position. In a searching process, the machine body position of the mobile robot is unchanged, but the current search position is changed.

It is to be noted that in a case of the pathfinding costs in the positive direction and the negative direction of the second preset coordinate axis are each set as the preset reference cost, a maximum pathfinding cost on the first preset coordinate axis is set as the maximum area pathfinding cost, and a minimum pathfinding cost on the first preset coordinate axis is set as the minimum area pathfinding cost. The first preset coordinate axis is a linear segment perpendicular to a currently-planned bow-shaped cleaning path of the mobile robot. The first preset coordinate axis and the second preset coordinate axis are mutually perpendicular coordinate axes pre-configured on the map. The pathfinding costs are represented by map grid distances in the positive direction and the negative direction of the second preset coordinate axis or in the positive direction and the negative direction of the first preset coordinate axis, and are proportional to the map grid distances. In the example, maximum/minimum distance costs for the mobile robot to search for the candidate entrance/exit in the direction of the first preset coordinate axis are configured, and a search step size in each direction of the coordinate axis is defined on the basis of the maximum/minimum distance costs, so that search is performed orderly.

Step S103, the mobile robot is controlled to move to the cleaning entrance position of the current non-cleaned sub-block, and then step S104 is entered. The mobile robot may be controlled to move from the current position to the cleaning entrance position of the current non-cleaned sub-block, in a manner including, but not limited to, travelling along an edge and travelling linearly.

Step S104, the mobile robot is controlled to start to perform cleaning and traversing along the bow-shaped cleaning path in the current non-cleaned sub-block. Then step S105 is entered.

Step S105, whether the mobile robot moves to the cleaning termination position of the current non-cleaned sub-block is determined, and if yes, step S106 is entered, otherwise step S104 is executed.

Step S106, whether all the divided sub-blocks are cleaned is determined, and if yes, cleaning is ended, otherwise returning to step S102 is executed. Steps S102-S105 described above are repeated, so as to search for and plan a cleaning entrance position and a cleaning termination position of a next non-cleaned sub-block. Moreover, according to a successive order of traversing the cleaning termination position of the current non-cleaned sub-block and the cleaning entrance position of the next non-cleaned sub-block, the bow-shaped cleaning path planned in the current non-cleaned sub-block and a bow-shaped cleaning path planned in the next non-cleaned sub-block are combined into a finally-planned cleaning path in the cleaning area, of the mobile robot until all the sub-blocks are cleaned.

In a case of not all the divided sub-blocks are cleaned, in a case of the mobile robot moves to the cleaning termination position of the current non-cleaned sub-block, firstly, the cleaning termination position of the current non-cleaned sub-block is updated as the current position, so as to serve as a new search planning start position, and then the method returns to step S102. A candidate entrance/exit satisfying the preset pathfinding cost condition and found at the cleaning termination position continues to be taken as a cleaning entrance position in the next non-cleaned sub-block. In the example, a navigation order for the mobile robot to clean and traverse different sub-blocks is planned, so that the mobile robot moves between different non-cleaned sub-blocks at a higher coverage rate. In a case of every one map grid is searched for and traversed, whether the map grid currently searched for is the marked candidate entrance/exit is determined in real time.

Preferably, In a case of not all the divided sub-blocks are cleaned, in a case of the mobile robot moves to the cleaning termination position of the current non-cleaned sub-block and has cleaned sub-blocks positioned in the same row of the cleaning area along the planned bow-shaped cleaning path, firstly, the cleaning termination position of the current non-cleaned sub-block is updated as the current position, so as to serve as a new search planning start position, and then the method returns to step S102. Steps S102-S106 are repeated, so as to search for and plan cleaning entrance positions and cleaning termination positions of non-cleaned sub-block in a next row, and then the robot enters and cleans the non-cleaned sub-block in the next row. In this way, the mobile robot preferentially searches for a candidate entrance/exit which is closest to the position of the mobile robot and lowest in traversal complexity as a cleaning entrance position of a non-cleaned sub-block, which is preferentially traversed, in the next row.

It should be noted that in a case of having cleaned one current sub-block, the mobile robot firstly searches for and determines an entrance position of the next non-cleaned sub-block, and then enters and cleans same. Cleaning start points for the mobile robot to clean all the sub-blocks in the same row are different. In a case of all the sub-blocks positioned in the same row are cleaned, the mobile robot searches for and determines an entrance position of the non-cleaned sub-blocks in the next row, and then enters and cleans same. In this case, the mobile robot will search for a point closest to the position of the mobile robot as a start point, so as to start to clean the sub-blocks in the next row. It may be seen that the cleaning path of the mobile robot controlled in the example is performed step by step from above and below, so that turn-back cleaning in a vertical direction is reduced, a useless repeated navigation behavior is avoided, and a cleaning effect is better.

Compared with a device known to the inventors, in the example, candidate entrances/exits in a rational navigation order are found in different sub-blocks according to the pathfinding costs in different directions of the coordinate axes as the cleaning entrance positions of the corresponding sub-blocks, thereby obtaining the finally-planned cleaning path in the cleaning area upon combination and connection, shortening a navigation path distance between different sub-blocks, a time for the robot to plan a path between areas in the room, and a calculation amount, and improving a cleaning effect of the mobile robot.

In combination with the foregoing example, cleaning of a room by a floor sweeping robot is described as an example:

As shown in FIG. 2, it is assumed that the flood sweeping robot cleans an area in the room. On a map shown in FIG. 2, a global coordinate system YOX is constructed with O as an origin. The point O (the origin of the global coordinate system) may be translated to a current position P, in area #1 in the room, of the mobile robot, facilitating localization-navigation search for a cleaning entrance position suitable for sub-area #1. The mobile robot starts from the position P of the cleaning area. In a movement process, an environment map construction module inside the mobile robot repeatedly senses environment feature information (corners, pillars, furniture, etc.), marks positions of obstacles according to the sensed environment feature information, and then constructs a map encompassing obstacle information (a pure black area in FIG. 2 is an impenetrable obstacle). Moreover, the robot takes a cleaning line whose two ends are positioned at boundaries on two sides of the map, respectively, and adjacent to the obstacle as the sub-block division line. The number of division lines is determined by the number and positions of obstacles. As shown in FIG. 2, there are two obstacles in parallel in an area in a first row of the room on the map and close to a wall (a boundary of the room), so that three cleaning lines are taken as sub-block division lines, which are positioned in sub-block #1, sub-block #2, and sub-block #3 in FIG. 2, respectively. There are two obstacles distributed at an interval in the middle (a third row) of the room on the map, so that three cleaning lines are also taken as sub-block division lines, which are positioned in sub-block #5, sub-block #6, and sub-block #7 in FIG. 2, respectively. Then, an area of an entire room is divided into 8 sub-blocks with the division lines and obstacle boundaries as boundaries, including the sub-blocks with serial numbers #1, #2, and #3 on the left side and the right side of the two obstacles in the first row, the sub-blocks with serial numbers #5, #6, and #7 on the left side and the right side of the two obstacles in the third row, a sub-block with a serial number #4 in a second row, and a sub-block with serial number #8 in a fourth row.

On the basis of the constraint in the above example, in the map in FIG. 2, a cleaning path in the area in the room is planned as follows:

In a case of the mobile robot searches for a candidate entrance/exit satisfying the preset pathfinding cost condition at the initial position P, if the mobile robot has found a first candidate entrance/exit B0 through pathfinding, pathfinding costs for searching for the first candidate entrance/exit B0 are calculated as follows: A pathfinding cost in a positive direction of an X axis is fixed to 1, a pathfinding cost for searching for the candidate entrance/exit in a positive direction of a Y axis is 10, and a pathfinding cost for searching for the candidate entrance/exit in a positive direction of the Y axis is 30. Thus, B0 is set as the candidate entrance/exit satisfying the preset pathfinding cost condition, that is, B0 is selected as a first cleaning entrance position, and determined as a cleaning entrance position of sub-block #1. Then another candidate entrance/exit B1 in sub-block #1 is set as a cleaning termination position of sub-block #1. After setting B0 as the cleaning entrance position, the mobile robot does not continue to perform search according to the pathfinding cost constraint in the foregoing example until the mobile robot cleans sub-block #1 along a planned bow-shaped cleaning path and reaches the cleaning termination position B1.

After the mobile robot cleans sub-block #1 along the planned bow-shaped cleaning path and reaches the cleaning termination position B1, in a case of the mobile robot continues to search for the candidate entrance/exit satisfying the preset pathfinding cost condition by taking B1 as a new search start point, if the mobile robot firstly finds a candidate entrance/exit A1 through pathfinding, through the method for the step that a pathfinding cost for the mobile robot to search for the candidate entrance/exit in a direction of a corresponding coordinate axis is calculated according to a ratio of the negative-direction pathfinding distance to the positive-direction pathfinding distance in the foregoing example, pathfinding costs for searching for the candidate entrance/exit A1 are as follows: a pathfinding cost in the positive direction of the X axis is fixed to 1, a pathfinding cost for searching for the candidate entrance/exit in the positive direction of the Y axis is 10, and a pathfinding cost for searching for the candidate entrance/exit in the positive direction of the Y axis is 30. Thus, A1 is set as the candidate entrance/exit satisfying the preset pathfinding cost condition. Since the candidate entrance/exit A1 is positioned in sub-block #2, sub-block #2 to which A1 belongs is selected as a next non-cleaned sub-block, A1 serves as a cleaning entrance position of sub-block #2, and then another candidate entrance/exit A0 in sub-block #2 is set as a cleaning termination position of sub-block #2.

After the mobile robot cleans sub-block #2 along the planned bow-shaped cleaning path from the candidate entrance/exit A1 and reaches the cleaning termination position A0, in a case of the mobile robot continues to search for the candidate entrance/exit satisfying the preset pathfinding cost condition by taking A0 as a new search start point, if the mobile robot firstly finds a candidate entrance/exit C1 through pathfinding, pathfinding costs for searching for the candidate entrance/exit C1 are obtained as follows: a pathfinding cost in the positive direction of the X axis is fixed to 1, a pathfinding cost for searching for the candidate entrance/exit in the positive direction of the Y axis is 10, and a pathfinding cost for searching for the candidate entrance/exit in the positive direction of the Y axis is 30. Thus, C1 is set as the candidate entrance/exit satisfying the preset pathfinding cost condition. Since the candidate entrance/exit C1 is positioned in sub-block #3, sub-block #3 to which C1 belongs is selected as a next non-cleaned sub-block, C1 serves as a cleaning entrance position of sub-block #3, and then another candidate entrance/exit C0 in sub-block #3 is set as a cleaning termination position of sub-block #3. It may be seen from the map in FIG. 2 that a distance between a position D0 of sub-block #4 and the search start point A0 is obviously smaller than that between the candidate entrance/exit C1 of sub-block #3 and the search start point A0. However, the candidate entrance/exit C1 is determined as the cleaning entrance position of the next non-cleaned sub-block on the basis of the method for the step that a pathfinding cost for searching for the candidate entrance/exit is calculated in the foregoing example, rather than selecting the closest candidate entrance/exit D0 as the cleaning entrance position of the next non-cleaned sub-block on the basis of the proximity principle. Then the mobile robot is controlled to start to clean sub-block #3 along the planned bow-shaped cleaning path from the candidate entrance/exit C1, and to reach the cleaning termination position C0. Then the cleaning termination position C0 is updated as a new search start position for searching for a cleaning entrance position of a next non-cleaned sub-block.

It is to be noted that on the map constructed by the mobile robot, in a case of the mobile robot finds the candidate entrance/exit satisfying the preset pathfinding cost condition at the search start point A0 or the candidate entrance/exit C0, a row of areas, in the positive direction of the Y axis, from the current position are cleaned areas or not configured with cleaning areas, a sub-block, in an area in a negative direction of a first preset coordinate axis from the current position, is to be cleaned by the mobile robot, the positive-direction pathfinding direction is calculated as 0. Through the method for the step that a pathfinding cost for the mobile robot to search for the candidate entrance/exit in a direction of a corresponding coordinate axis to the current search position is calculated according to a ratio of the negative-direction pathfinding distance to the positive-direction pathfinding distance in the foregoing example, in the example, a pathfinding cost for searching for a map grid in a positive direction of the first preset coordinate axis is set as a minimum area pathfinding cost, and a pathfinding cost for searching for a map grid in the negative direction of the first preset coordinate axis is set as a maximum area pathfinding cost. A currently-found candidate entrance/exit is determined to satisfy the preset pathfinding cost condition, the candidate entrance/exit D0 is determined as the candidate entrance/exit, satisfying the preset pathfinding cost condition, found by the mobile robot at the candidate entrance/exit C0, and D0 is set as a cleaning entrance position of next non-cleaned sub-block #4. Therefore, the mobile robot traverses the bow-shaped cleaning path from the positive direction of the first preset coordinate axis to the negative direction of the first preset coordinate axis in the sub-block.

The foregoing steps are repeatedly performed until the mobile robot finds that there is no non-cleaned sub-block in the cleaning area on the map in FIG. 2. According to the above cleaning path planning manner, cleaning path planning finally planned and combined may be expressed as:

P→B0→B1→A1→A0→C1→C0→D0→D1→E0→E1→F1→F0→G0→G1→H0→H1.

Sub-block #1, sub-block #2, sub-block #3, sub-block #4, sub-block #5, sub-block #6, sub-block #7, and sub-block #8 are cleaned gradually in a navigation order from the positive direction of the Y axis to the negative direction of the Y axis, without re-cleaning and re-traversing the candidate entrances/exits that have been traversed before and the sub-blocks that have been cleaned before.

It should be noted that in the example, the maximum area pathfinding cost is preferably 30, the minimum area pathfinding cost is preferably 10, and the preset reference cost is preferably 1. These pathfinding costs are not fixed, but are set according to the cleaning planning requirements of the current cleaning area or obstacle distribution features of the current cleaning area. In the example, according to the distance relation between the cleaning lines in two opposite directions of the same coordinate axis and the current position of the robot, a sub-block entrance search path, with a lower traversal difficulty, found by the robot is selected. Compared with a device known to the inventors, the number of turn-back and reciprocated travelling, in a bow-shaped cleaning process in the same sub-block, of the robot is reduced.

As an example, in step 2, a method for the step that a candidate entrance/exit, satisfying a preset pathfinding cost condition and found in the current non-cleaned sub-block by the mobile robot at a current position is set as a cleaning entrance position of the current non-cleaned sub-block includes:

The mobile robot starts to search for and plan the bow-shaped cleaning path in the current non-cleaned sub-block from a map grid position corresponding to the current position, and searches for and traverses a map grid distance corresponding to the preset pathfinding cost in the positive direction of the first preset coordinate axis on the map in a case of everyone map grid distance corresponding to the minimum area pathfinding cost is searched for and traversed in the positive direction and the negative direction of the second preset coordinate axis. After searching for and traversing the map grid distance corresponding to the preset reference cost in the positive direction of the first preset coordinate axis with respect to the map grid position corresponding to the current position of the mobile robot, from a found and traversed position on the first preset coordinate axis, the step that the map grid distance corresponding to the preset pathfinding cost is searched for and traversed in the positive direction and the negative direction of the second preset coordinate axis is performed synchronously with the step that a map grid distance is searched for and traversed in the positive direction and the negative direction of the second preset coordinate axis before the searching for and traversing the map grid distance corresponding to the preset reference cost in the positive direction of the first preset coordinate axis.

From a map grid position corresponding to the current position of the mobile robot, the map grid distance corresponding to the preset reference cost is searched for in a preset direction of the first preset coordinate axis on the map in a case of every a map grid distance corresponding to the maximum area pathfinding cost is searched for in the positive direction and the negative direction of the second preset coordinate axis on the map. After searching for and traversing the map grid distance corresponding to the preset reference cost in the negative direction of the first preset coordinate axis, from the found and traversed position on the first preset coordinate axis, the step that the map grid distance corresponding to the preset reference cost is searched for and traversed in a preset direction of the first preset coordinate axis is performed synchronously with the step that a map grid distance is searched for in the positive direction and the negative direction of the second preset coordinate axis before the searching for and traversing the map grid distance corresponding to the preset reference cost in the negative direction of the first preset coordinate axis.

It is to be noted that in a case of every each map grid is searched for and traversed, whether the map grid currently found belongs to the candidate entrance/exit is determined in real time, and a pathfinding cost for current search and traversal is calculated in real time through the method for the step that a pathfinding cost for the mobile robot to search for the candidate entrance/exit in a direction of a corresponding coordinate axis is calculated according to a ratio of the negative-direction pathfinding distance to the positive-direction pathfinding distance in the foregoing example. The preset direction includes the positive direction of the coordinate axis or the negative direction of the coordinate axis.

Therefore, the technical effect of such a search step size may be implemented under an actual scenario: for example, in a case of the step size is 0.05 m, a pathfinding cost in the positive direction or the negative direction of x is 1, a pathfinding cost in the positive direction of y is 10, and a pathfinding cost in the negative direction of y is 30, it indicates that in a case of every the x axis is extended by 0.5 m in the positive direction or the negative direction, the y axis is extended by a first extension step size of 0.05 m in the positive direction, and in a case of every the x axis is extended by 1.5 m in the positive direction or the negative direction, y is extended by a second extension step size of 0.05 m in the negative direction.

The steps described above are repeated, and different numbers of grids are searched for and traversed in the positive direction and the negative direction of the second preset coordinate axis and the direction of the first preset coordinate axis according to change rules of grids searching for and traversing in different directions of the coordinate axes until it is found at the current search position that a preset multiple of the preset reference cost is a pathfinding cost for searching and traversing in the positive direction or the negative direction of the second preset coordinate axis, a preset multiple of the minimum area pathfinding cost is the pathfinding cost for searching and traversing in the positive direction of the first preset coordinate axis, and a preset multiple of the maximum area pathfinding cost is the pathfinding cost for searching and traversing in the negative direction of the first preset coordinate axis. Accordingly, a first candidate entrance/exit found and traversed is determined to satisfy the preset pathfinding cost condition, and set as the cleaning entrance position of the current non-cleaned sub-block. The preset multiple is an integer greater than or equal to 1. Compared with a device known to the inventors, the cleaning entrance position selected in the example is not necessarily the cleaning start position closest to the initial position of the robot. However, the first candidate entrance/exit satisfying a traversal complexity condition may be searched for in different directions of the coordinate axes in the current non-cleaned sub-block in a preset traversal order according to the maximum/minimum pathfinding costs and search directions, so that the first candidate entrance/exit becomes a position most easily approachable by the mobile robot through travelling from the current position. That is to say, upon search and comparison, one candidate entrance/exit with the minimum sum of pathfinding costs in different directions of the coordinate axes may also guide the mobile robot to shorten a turn-back path in the bow-shaped cleaning process in the current non-cleaned sub-block, and thus the robot may move between the sub-blocks at a higher coverage rate.

It is to be noted that in the foregoing example, the step that the mobile robot searches for and traverses a map grid distance corresponding to the preset pathfinding cost in the positive direction of the first preset coordinate axis on the map in a case of a map grid distance corresponding to the minimum area pathfinding cost is searched for and traversed in the positive direction and the negative direction of the second preset coordinate axis is equivalent to the case that a pathfinding cost for searching for a map grid in the positive direction of the first preset coordinate axis is the minimum area pathfinding costs in a case of a pathfinding cost for searching for the map grid in the positive direction or the negative direction of the second preset coordinate axis is set as the preset reference cost. The map grid searched for includes grid positions, distributed in parallel, in any row of the second preset coordinate axis.

The step that a map grid distance corresponding to the maximum area pathfinding cost is searched for and traversed in the negative direction of the first preset coordinate axis on the map in a case of a map grid distance corresponding to the minimum area pathfinding cost is searched for and traversed in the positive direction and the negative direction of the second preset coordinate axis on the map is equivalent to the case that a pathfinding cost for searching for a map grid in the negative direction of the first preset coordinate axis is the minimum area pathfinding costs in a case of a pathfinding cost for searching for the map grid in the positive direction or the negative direction of the second preset coordinate axis is set as the preset reference cost. The map grid searched for includes grid positions, distributed in parallel, in any row of the second preset coordinate axis.

In the foregoing example, in a case of the first preset coordinate axis is an X axis of the map, the second preset coordinate axis is a Y axis of the map; and in a case of the second preset coordinate axis is an X axis of the map, the first preset coordinate axis is a Y axis of the map. The drawings of the description only schematically illustrate an example in which in a case of the second preset coordinate axis is the X axis of the map, the first preset coordinate axis is the Y axis of the map. With respect to an example in which in a case of the first preset coordinate axis is the X axis of the map, the second preset coordinate axis is the Y axis of the map, compared with the example described in the drawings of the description, only the step of separately searching for and traversing grid distances corresponding to unequal pathfinding costs in the positive direction and the negative direction of the Y axis in the example in the drawings of the description is changed to the search and traversal extended step of separately searching for and traversing grid distances corresponding to unequal pathfinding costs in the positive direction and the negative direction of the Y axis; and the step of separately searching for and traversing grid distances corresponding to equal pathfinding costs in the positive direction and the negative direction of the X axis in the example in the accompanying drawings of the description is changed to the search and traversal extended step of separately searching for and traversing grid distances corresponding to unequal pathfinding costs in the positive direction and the negative direction of the X axis. Therefore, the example in which in a case of the first preset coordinate axis is the X axis of the map, the second preset coordinate axis is the Y axis of the map will not be repeated herein.

Further disclosed is a chip, internally configured with a control program, where the control program is configured for controlling a mobile robot to execute the cleaning path planning method based on a pathfinding cost. The chip provided by the disclosure is used, thereby shortening a navigation path distance, between different sub-blocks, of the mobile robot and a calculation amount, satisfying real-time requirements of a navigation calculation, and improving a cleaning effect of the mobile robot. The chip can be mounted on an intelligent mobile robot such as a floor sweeping robot, a lawn mowing robot, a window cleaning robot, a demining robot, etc.

Further disclosed is a cleaning robot, configured with a master control chip, where the master control chip is the chip. The cleaning robot of the disclosure is used, thereby cleaning a room at a low cost, shortening a time for the robot to plan a path between areas in the room, and improving user experience. The cleaning robot has the same technical effect as the cleaning path planning method based on a pathfinding cost described above, which will not be repeated herein.

In the example of the disclosure, the cleaning robot includes a floor sweeping robot, where the floor sweeping robot includes a route planning device for the floor sweeping robot, a processor, and a memory. The processor and the memory are electrically connected directly or indirectly to implement data transmission or interaction. For example, these elements can be electrically connected to each other through one or more communication buses or signal lines. The route planning device for the floor sweeping robot includes at least one software module which can be stored in the memory or solidified in an operating system (OS) of the floor sweeping robot in the form of software or firmware. The processor is configured for executing executable modules stored in the memory, such as software function modules and computer programs included in the route planning device for the floor sweeping robot. The processor can execute the computer programs upon receiving execution instructions. The processor can be an integrated circuit chip having a signal processing capacity. The processor can also be a general-purpose processor, such as a digital signal processor (DSP), an application specific integrated circuit (ASIC), a discrete gate or transistor logic device, or a discrete hardware assembly, and implement or execute all the methods, steps, and logic block diagrams in the examples of the disclosure. In addition, the general-purpose processor can be a microprocessor, any conventional processor, etc.

The memory can be, but is not limited to, a random access memory (RAM), a read only memory (ROM), a programmable read-only memory (PROM), an erasable programmable read-only memory (EPROM), an electric erasable programmable read-only memory (EEPROM), etc. The memory is configured for storing the program, and the processor executes the program upon receiving the execution instruction.

In the end, it should be noted that all the above examples are only used to illustrate the technical solutions of the disclosure, but not to limit same. While the disclosure has been described in detail with reference to all the foregoing examples, it should be understood by those of ordinary skill in the art that they can still modify the technical solutions described in all the foregoing examples, or make equivalent substitutions to some or all of the technical features of the technical solutions. However, these modifications or substitutions do not make the essence of the corresponding technical solutions depart from the scope of the technical solutions of all the examples of the disclosure.

What is claimed is:

1. A cleaning path planning method based on a pathfinding cost, comprising:

step 1, configuring cleaning lines in a map matching a cleaning area according to map boundaries and obstacle boundaries in different directions in the cleaning area of a mobile robot, correspondingly dividing the map into a preset number of sub-blocks in combination with the cleaning lines serving as sub-block division lines and the obstacle boundaries, and marking, in each sub-block, an endpoint position of a cleaning line serving as the sub-block division line as a candidate entrance/exit of the sub-block, wherein the cleaning lines serving as the sub-block division lines are configured for being connected into a bow-shaped cleaning path planned in the sub-block;

step 2, setting a candidate entrance/exit satisfying a preset pathfinding cost condition and found in a current non-cleaned sub-block by the mobile robot at a current position as a cleaning entrance position of the current non-cleaned sub-block, and determining a cleaning termination position of the current non-cleaned sub-block combining the cleaning entrance position and a bow-shaped cleaning path planned in the current non-cleaned sub-block;

step 3, controlling the mobile robot to move to the cleaning entrance position of the current non-cleaned sub-block, and then to start to perform cleaning and traversing along the bow-shaped cleaning path in the current non-cleaned sub-block; and step 4, searching for and planning a cleaning entrance position and a cleaning termination position of a next non-cleaned sub-block by repeating steps 2-3 described above in a case of the mobile robot moves to the cleaning termination position of the current non-cleaned sub-block, and combining the bow-shaped cleaning path planned in the current non-cleaned sub-block with a bow-shaped cleaning path planned in the next non-cleaned sub-block into a finally-planned cleaning path of the mobile robot in the cleaning area in a successive order of traversing the cleaning termination position of the current non-cleaned sub-block and the cleaning entrance position of the next non-cleaned sub-block until all the sub-blocks are cleaned;

wherein in a case of sub-blocks positioned in the same row of the cleaning area are cleaned along planned bow-shaped cleaning paths, the mobile robot repeats steps 2-3 to search for and plan cleaning entrance positions and cleaning termination positions of non-cleaned sub-blocks in a next row, and then enters and cleans the non-cleaned sub-blocks in the next row;

wherein cleaning start points for the mobile robot to clean all the sub-blocks in the same row are different, in a case of all the sub-blocks positioned in the same row are cleaned, the mobile robot searches for and determines an entrance position of the non-cleaned sub-blocks in the next row, and then enters and cleans same, in this case, the mobile robot will search for a point closest to the position of the mobile robot as a start point, so as to start to clean the sub-blocks in the next row;

wherein the step 2 further comprises:

in all non-cleaned sub-blocks, setting a length of a vertical line segment between a cleaning line distributed on an outermost side in a positive direction of a first preset coordinate axis and a current search position of the mobile robot as a positive-direction pathfinding distance, formed in the positive direction of the first preset coordinate axis of the mobile robot, and setting a length of a vertical line segment between a cleaning line distributed on an outermost side in a negative direction of the first preset coordinate axis and the current search position of the mobile robot as a negative-direction pathfinding distance, formed in the negative direction of the first preset coordinate axis of the mobile robot; and calculating a pathfinding cost for the mobile robot to search for the candidate entrance/exit in a direction of a corresponding coordinate axis according to a ratio of the negative-direction pathfinding distance to the positive-direction pathfinding distance, so that in a case of a pathfinding cost, in one direction of the first preset coordinate axis, of the mobile robot is a minimum area pathfinding cost, a relatively smaller pathfinding cost is selected from a maximum area pathfinding cost and an adjusted minimum area pathfinding cost as a pathfinding cost in the other direction of the first preset coordinate axis, and the relatively smaller pathfinding cost does not exceed the maximum area pathfinding cost; wherein the maximum area pathfinding cost and the minimum area pathfinding cost are set according to cleaning planning requirements of the current cleaning area;

wherein the step 1 further comprises:

starting from a boundary of the map, the cleaning line stops in a case of a boundary on another side of the map or a boundary on one side of the obstacle is detected, in a case of the boundary on one side of the obstacle is met, the cleaning line immediately starts from a boundary on another side of the obstacle until a boundary on another side of the map is detected, distances between the cleaning lines are equal;

next, taking a cleaning line whose two ends are positioned at boundaries on two sides of the map, respectively, and spaced from the obstacle by at least one radius of the mobile robot as the sub-block division line; and if the division line is positioned between two obstacles and a distance between the two obstacles is less than a diameter of the mobile robot, the two obstacles are regarded as a whole, and the cleaning line is not taken as the division line.

2. The cleaning path planning method according to claim 1, wherein in a case of the method returns to the step 2 from the step 4, the cleaning termination position of the current non-cleaned sub-block is updated as the current position, and a candidate entrance/exit satisfying the preset pathfinding cost condition and found at the cleaning termination position is taken as the cleaning entrance position of the next non-cleaned sub-block.

3. The cleaning path planning method according to claim 1, wherein in the step 1, the bow-shaped cleaning path in the current non-cleaned sub-block consists of cleaning lines of the sub-block to which the current non-cleaned sub-block belongs, wherein a head end and a tail end of a bow-shaped cleaning path in each sub-block are set as candidate entrances/exits of the corresponding sub-block.

4. The cleaning path planning method according to claim 3, wherein in the step 1, a method for setting, in each sub-block, the endpoint position of the cleaning line serving as the sub-block division line as the candidate entrance/exit of the sub-block comprises:

setting a tail end of the bow-shaped cleaning path as the cleaning termination position of the current non-cleaned sub-block in a case of a head end of the bow-shaped cleaning path planned in the current non-cleaned sub-block is determined as the cleaning entrance position; and alternatively, setting a head end of the bow-shaped cleaning path as the cleaning termination position of the current non-cleaned sub-block in a case of a tail end of the bow-shaped cleaning path planned in the current non-cleaned sub-block is determined as the cleaning entrance position.

5. The cleaning path planning method according to claim 4, wherein a method for calculating the pathfinding cost for the mobile robot to search for the candidate entrance/exit in the direction of the corresponding coordinate axis according to the ratio of the negative-direction pathfinding distance to the positive-direction pathfinding distance comprises:

setting a pathfinding cost for the mobile robot to search for the candidate entrance/exit in the positive direction of the first preset coordinate axis from the current position to the current search position as the minimum area pathfinding cost in a case of the ratio of the negative-direction pathfinding distance to the positive-direction pathfinding distance is greater than 1, taking a product of the minimum area pathfinding cost and the ratio greater than 1 as the adjusted minimum area pathfinding cost, and then selecting the relatively smaller pathfinding cost from the maximum area pathfinding cost and the adjusted minimum area pathfinding cost as a pathfinding cost for searching for the candidate entrance/exit in the negative direction of the first preset coordinate axis from the current position;

setting a pathfinding cost for the mobile robot to search for the candidate entrance/exit in the positive direction of the first preset coordinate axis from the current position to the current search position as the minimum area pathfinding cost, and setting a pathfinding cost for the mobile robot to search for the candidate entrance/exit in the negative direction of the first preset coordinate axis from the current position as the minimum area pathfinding cost in a case of the ratio of the negative-direction pathfinding distance to the positive-direction pathfinding distance is equal to 1;

and setting a pathfinding cost for the mobile robot to search for the candidate entrance/exit in the negative direction of the first preset coordinate axis from the current position to the current search position as the minimum area pathfinding cost in a case of the ratio of the negative-direction pathfinding distance to the positive-direction pathfinding distance is less than 1, taking a ratio of the minimum area pathfinding cost to the ratio less than 1 as the adjusted minimum area pathfinding cost, and then selecting the relatively smaller pathfinding cost from the maximum area pathfinding cost and the adjusted minimum area pathfinding cost as a pathfinding cost for searching for the candidate entrance/exit in the positive direction of the first preset coordinate axis from the current position.

6. The cleaning path planning method according to claim 5, wherein the step 2 comprises:
  determining that a first found candidate entrance/exit satisfies the preset pathfinding cost condition, and setting the first found candidate entrance/exit as the cleaning entrance position of the current non-cleaned sub-block in a case of the mobile robot at the current position finds and traverses the candidate entrance/exit at the current search position, and it is calculated that a pathfinding cost on a second preset coordinate axis equals a preset multiple of a preset reference cost, the pathfinding cost for searching for the candidate entrance/exit in the positive direction of the first preset coordinate axis equals a preset multiple of the minimum area pathfinding cost, and the pathfinding cost for searching for the candidate entrance/exit in the negative direction of the first preset coordinate axis equals a preset multiple of the maximum area pathfinding cost; wherein
  the preset multiple is an integer greater than or equal to 1; the found candidate entrance/exit is the current search position; and in a search process, a machine body position of the mobile robot is unchanged, but the current search position is changed.

7. The cleaning path planning method according to claim 6, wherein a method for setting the candidate entrance/exit satisfying the preset pathfinding cost condition and found in the current non-cleaned sub-block by the mobile robot at the current position as a cleaning entrance position of the current non-cleaned sub-block comprises:
  step 11, enabling the mobile robot to start to search from a map grid position corresponding to the current position and to search for and traverse a map grid distance corresponding to the preset reference cost in the positive direction of the first preset coordinate axis on the map in a case of every a map grid distance corresponding to the minimum area pathfinding cost is searched for and traversed in a positive direction and a negative direction of the second preset coordinate axis;
  step 12, enabling the mobile robot to search for and traverse the map grid distance corresponding to the preset reference cost in the negative direction of the first preset coordinate axis from the map grid position corresponding to the current position of the mobile robot in a case of everyone map grid distance corresponding to the maximum area pathfinding cost is searched for and traversed in the positive direction and the negative direction of the second preset coordinate axis; and
  repeating steps 11-12 described above, and determining that the first found and traversed candidate entrance/exit satisfies the preset pathfinding cost condition, and setting the candidate entrance/exit as the cleaning entrance position of the current non-cleaned sub-block in a case of it is calculated that a pathfinding cost for searching and traversing in the positive direction or the negative direction of the second preset coordinate axis equals a preset multiple of the preset reference cost, the pathfinding cost for searching and traversing in the positive direction of the first preset coordinate axis equals the preset multiple of the minimum area pathfinding cost, and the pathfinding cost for searching and traversing in the negative direction of the first preset coordinate axis equals the preset multiple of the maximum area pathfinding cost at the current search position; wherein in a case of every one map grid is searched for and traversed, whether the map grid currently found is the marked candidate entrance/exit is determined in real time.

8. The cleaning path planning method according to claim 1, wherein in a case of the first preset coordinate axis is an X axis of the map, the second preset coordinate axis is a Y axis of the map; and in a case of the second preset coordinate axis is an X axis of the map, the first preset coordinate axis is a Y axis of the map.

9. A chip, internally configured with a control program, wherein the control program is configured for controlling a mobile robot to execute a cleaning path planning method based on a pathfinding cost, wherein the method comprises:
  step 1, configuring cleaning lines in a map matching a cleaning area according to map boundaries and obstacle boundaries in different directions in the cleaning area of a mobile robot, correspondingly dividing the map into a preset number of sub-blocks in combination with the cleaning lines serving as sub-block division lines and the obstacle boundaries, and marking, in each sub-block, an endpoint position of a cleaning line serving as the sub-block division line as a candidate entrance/exit of the sub-block, wherein the cleaning lines serving as the sub-block division lines are configured for being connected into a bow-shaped cleaning path planned in the sub-block;
  step 2, setting a candidate entrance/exit satisfying a preset pathfinding cost condition and found in a current non-cleaned sub-block by the mobile robot at a current position as a cleaning entrance position of the current non-cleaned sub-block, and determining a cleaning termination position of the current non-cleaned sub-block combining the cleaning entrance position and a bow-shaped cleaning path planned in the current non-cleaned sub-block;
  step 3, controlling the mobile robot to move to the cleaning entrance position of the current non-cleaned sub-block, and then to start to perform cleaning and traversing along the bow-shaped cleaning path in the current non-cleaned sub-block; and
  step 4, searching for and planning a cleaning entrance position and a cleaning termination position of a next non-cleaned sub-block by repeating steps 2-3 described above in a case of the mobile robot moves to the cleaning termination position of the current non-cleaned sub-block, and combining the bow-shaped cleaning path planned in the current non-cleaned sub-block with a bow-shaped cleaning path planned in the next non-cleaned sub-block into a finally-planned cleaning path of the mobile robot in the cleaning area in a successive order of traversing the cleaning termination position of the current non-cleaned sub-block and the cleaning entrance position of the next non-cleaned sub-block until all the sub-blocks are cleaned;
  wherein in a case of sub-blocks positioned in the same row of the cleaning area are cleaned along planned bow-shaped cleaning paths, the mobile robot repeats steps 2-3 to search for and plan cleaning entrance positions and cleaning termination positions of non-cleaned sub-blocks in a next row, and then enters and cleans the non-cleaned sub-blocks in the next row;
  wherein cleaning start points for the mobile robot to clean all the sub-blocks in the same row are different, in a case of all the sub-blocks positioned in the same row are cleaned, the mobile robot searches for and determines an entrance position of the non-cleaned sub-blocks in the next row, and then enters and cleans same, in this case, the mobile robot will search for a point closest to the position of the mobile robot as a start point, so as to start to clean the sub-blocks in the next row;

wherein the step 2 further comprises:

in all non-cleaned sub-blocks, setting a length of a vertical line segment between a cleaning line distributed on an outermost side in a positive direction of a first preset coordinate axis and a current search position of the mobile robot as a positive-direction pathfinding distance, formed in the positive direction of the first preset coordinate axis of the mobile robot, and setting a length of a vertical line segment between a cleaning line distributed on an outermost side in a negative direction of the first preset coordinate axis and the current search position of the mobile robot as a negative-direction pathfinding distance, formed in the negative direction of the first preset coordinate axis of the mobile robot; and calculating a pathfinding cost for the mobile robot to search for the candidate entrance/exit in a direction of a corresponding coordinate axis according to a ratio of the negative-direction pathfinding distance to the positive-direction pathfinding distance, so that in a case of a pathfinding cost, in one direction of the first preset coordinate axis, of the mobile robot is a minimum area pathfinding cost, a relatively smaller pathfinding cost is selected from a maximum area pathfinding cost and an adjusted minimum area pathfinding cost as a pathfinding cost in the other direction of the first preset coordinate axis, and the relatively smaller pathfinding cost does not exceed the maximum area pathfinding cost; wherein the maximum area pathfinding cost and the minimum area pathfinding cost are set according to cleaning planning requirements of the current cleaning area;

wherein the step 1 further comprises:

starting from a boundary of the map, the cleaning line stops in a case of a boundary on another side of the map or a boundary on one side of the obstacle is detected, in a case of the boundary on one side of the obstacle is met, the cleaning line immediately starts from a boundary on another side of the obstacle until a boundary on another side of the map is detected, distances between the cleaning lines are equal;

next, taking a cleaning line whose two ends are positioned at boundaries on two sides of the map, respectively, and spaced from the obstacle by at least one radius of the mobile robot as the sub-block division line; and if the division line is positioned between two obstacles and a distance between the two obstacles is less than a diameter of the mobile robot, the two obstacles are regarded as a whole, and the cleaning line is not taken as the division line;

the chip is a processor capable of storing and executing a control program.

10. A cleaning robot, configured with a master control chip, wherein the master control chip is the chip according to claim 9.

11. The chip according to claim 9, wherein in a case of the method returns to the step 2 from the step 4, the cleaning termination position of the current non-cleaned sub-block is updated as the current position, and a candidate entrance/exit satisfying the preset pathfinding cost condition and found at the cleaning termination position is taken as the cleaning entrance position of the next non-cleaned sub-block.

12. The chip according to claim 9, wherein in the step 1, the bow-shaped cleaning path in the current non-cleaned sub-block consists of cleaning lines of the sub-block to which the current non-cleaned sub-block belongs, wherein a head end and a tail end of a bow-shaped cleaning path in each sub-block are set as candidate entrances/exits of the corresponding sub-block.

13. The chip according to claim 12, wherein a method for calculating the pathfinding cost for the mobile robot to search for the candidate entrance/exit in the direction of the corresponding coordinate axis according to the ratio of the negative-direction pathfinding distance to the positive-direction pathfinding distance comprises:

setting a pathfinding cost for the mobile robot to search for the candidate entrance/exit in the positive direction of the first preset coordinate axis from the current position to the current search position as the minimum area pathfinding cost in a case of the ratio of the negative-direction pathfinding distance to the positive-direction pathfinding distance is greater than 1, taking a product of the minimum area pathfinding cost and the ratio greater than 1 as the adjusted minimum area pathfinding cost, and then selecting the relatively smaller pathfinding cost from the maximum area pathfinding cost and the adjusted minimum area pathfinding cost as a pathfinding cost for searching for the candidate entrance/exit in the negative direction of the first preset coordinate axis from the current position;

setting a pathfinding cost for the mobile robot to search for the candidate entrance/exit in the positive direction of the first preset coordinate axis from the current position to the current search position as the minimum area pathfinding cost, and setting a pathfinding cost for the mobile robot to search for the candidate entrance/exit in the negative direction of the first preset coordinate axis from the current position as the minimum area pathfinding cost in a case of the ratio of the negative-direction pathfinding distance to the positive-direction pathfinding distance is equal to 1;

and setting a pathfinding cost for the mobile robot to search for the candidate entrance/exit in the negative direction of the first preset coordinate axis from the current position to the current search position as the minimum area pathfinding cost in a case of the ratio of the negative-direction pathfinding distance to the positive-direction pathfinding distance is less than 1, taking a ratio of the minimum area pathfinding cost to the ratio less than 1 as the adjusted minimum area pathfinding cost, and then selecting the relatively smaller pathfinding cost from the maximum area pathfinding cost and the adjusted minimum area pathfinding cost as a pathfinding cost for searching for the candidate entrance/exit in the positive direction of the first preset coordinate axis from the current position.

14. The chip according to claim 13, wherein the step 2 comprises:

determining that a first found candidate entrance/exit satisfies the preset pathfinding cost condition, and setting the first found candidate entrance/exit as the cleaning entrance position of the current non-cleaned sub-block in a case of the mobile robot at the current position finds and traverses the candidate entrance/exit at the current search position, and it is calculated that a pathfinding cost on a second preset coordinate axis equals a preset multiple of a preset reference cost, the pathfinding cost for searching for the candidate entrance/exit in the positive direction of the first preset coordinate axis equals a preset multiple of the minimum area pathfinding cost, and the pathfinding cost for searching for the candidate entrance/exit in the negative direction of the first preset coordinate axis equals a preset multiple of the maximum area pathfinding cost; wherein the preset multiple is an integer greater than or equal to 1; the found candidate entrance/exit is the current search position; and in a search process, a machine body position of the mobile robot is unchanged, but the current search position is changed.

15. The chip according to claim 14, wherein a method for setting the candidate entrance/exit satisfying the preset pathfinding cost condition and found in the current non-cleaned sub-block by the mobile robot at the current position as a cleaning entrance position of the current non-cleaned sub-block comprises:

enabling the mobile robot to start to search from a map grid position corresponding to the current position and to search for and traverse a map grid distance corresponding to the preset reference cost in the positive direction of the first preset coordinate axis on the map in a case of every a map grid distance corresponding to the minimum area pathfinding cost is searched for and traversed in a positive direction and a negative direction of the second preset coordinate axis;

enabling the mobile robot to search for and traverse the map grid distance corresponding to the preset reference cost in the negative direction of the first preset coordinate axis from the map grid position corresponding to the current position of the mobile robot in a case of everyone map grid distance corresponding to the maximum area pathfinding cost is searched for and traversed in the positive direction and the negative direction of the second preset coordinate axis; and repeating the two steps described above, and determining that the first found and traversed candidate entrance/exit satisfies the preset pathfinding cost condition, and setting the candidate entrance/exit as the cleaning entrance position of the current non-cleaned sub-block in a case of it is calculated that a pathfinding cost for searching and traversing in the positive direction or the negative direction of the second preset coordinate axis equals a preset multiple of the preset reference cost, the pathfinding cost for searching and traversing in the positive direction of the first preset coordinate axis equals the preset multiple of the minimum area pathfinding cost, and the pathfinding cost for searching and traversing in the negative direction of the first preset coordinate axis equals the preset multiple of the maximum area pathfinding cost at the current search position;

wherein in a case of every one map grid is searched for and traversed, whether the map grid currently found is the marked candidate entrance/exit is determined in real time.

16. The chip according to claim 9, wherein in a case of the first preset coordinate axis is an X axis of the map, the second preset coordinate axis is a Y axis of the map; and in a case of the second preset coordinate axis is an X axis of the map, the first preset coordinate axis is a Y axis of the map.

* * * * *